United States Patent
Alagiriswamy et al.

(10) Patent No.: US 11,010,275 B2
(45) Date of Patent: *May 18, 2021

(54) OBJECT ORIENTED DATA TRACKING ON CLIENT AND REMOTE SERVER

(71) Applicant: Microsoft Technology Licensing, LLC, Redmond, WA (US)

(72) Inventors: Narendra Babu Alagiriswamy, Bothel, WA (US); Nicholas J. Nehrhood, Kirkland, WA (US); Nagaraju Palla, Bothell, WA (US); Raghavendra Bhuthpur, Sammamish, WA (US); Nagaraj Patil, Redmond, WA (US); Ricardo S. Stern, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 145 days.

This patent is subject to a terminal disclaimer.

(21) Appl. No.: 16/356,597

(22) Filed: Mar. 18, 2019

(65) Prior Publication Data

US 2019/0213110 A1 Jul. 11, 2019

Related U.S. Application Data

(63) Continuation of application No. 15/425,027, filed on Feb. 6, 2017, now Pat. No. 10,289,526.

(51) Int. Cl.
*G06F 11/36* (2006.01)
*G06F 16/248* (2019.01)
*G06F 16/2455* (2019.01)
*G06F 11/34* (2006.01)
*G06F 11/30* (2006.01)

(52) U.S. Cl.
CPC ...... *G06F 11/3636* (2013.01); *G06F 11/3055* (2013.01); *G06F 11/3466* (2013.01); *G06F 11/3495* (2013.01); *G06F 11/3664* (2013.01); *G06F 16/248* (2019.01); *G06F 16/2455* (2019.01)

(58) Field of Classification Search
CPC ............ G06F 11/3055; G06F 11/3495; G06F 11/3636; G06F 11/3466; G06F 11/3664; G06F 16/248; G06F 16/951; G06F 16/9535; G06F 16/2455
See application file for complete search history.

(56) References Cited

U.S. PATENT DOCUMENTS

| | | | | |
|---|---|---|---|---|
| 7,222,053 B2* | 5/2007 | Snyder | ............... | G06F 11/0739 702/187 |
| 10,289,526 B2* | 5/2019 | Alagiriswamy | .... | G06F 11/3636 |
| 2006/0010356 A1* | 1/2006 | Snyder | ............... | G06F 11/0787 714/56 |
| 2014/0317073 A1* | 10/2014 | Jain | ..................... | G06F 16/3326 707/706 |
| 2015/0161276 A1* | 6/2015 | Upstill | ............. | G06F 16/24534 707/708 |

* cited by examiner

*Primary Examiner* — Nadeem Iqbal
(74) *Attorney, Agent, or Firm* — Christopher J. Volkmann; Kelly, Holt & Christenson, PLLC

(57) ABSTRACT

Trace information representing a program object is automatically logged on a client computing system. It is uploaded to a service computing system where it is configured to be searchable on a property-by-property basis.

20 Claims, 12 Drawing Sheets

Sara Exception.FaultingMethod

15 Values, 67.725% of events      Selected [Yes] [No]

Reports
Top values    Top values by time    Rare values
Events with this field

| Top 10 Values | Count | % | |
|---|---|---|---|
| UploadDatainternal | 56 | 43.75% | ■ |
| GetRequest | 40 | 31.25% | ■ |
| .ctor | 9 | 7.031% | ▪ |
| Get_Password | 6 | 4.688% | ▪ |
| CreateAsync | 3 | 2.344% | ▪ |
| GetSaraTypeFromFullClassName | 3 | 2.344% | ▪ |
| InternalWaitOne | 2 | 1.562% | |
| SwitchSaraPage | 2 | 1.562% | |
| <OnEnter>b__0 | 1 | 0.781% | |
| AsVisual | 1 | 0.781% | |

OBJECT ORIENTED DATA TRACKING ON CLIENT AND REMOTE SERVER

CROSS-REFERENCE TO RELATED APPLICATION

The present application is a continuation of and claims priority of U.S. patent application Ser. No. 15/425,027, filed Feb. 6, 2017, the content of which is hereby incorporated by reference in its entirety.

BACKGROUND

Computing systems are currently in wide use. Some computing systems run software programs or other components that perform various different types of operations.

Such computing systems or software applications (or programs) can have issues which hinder or degrade the operation of the computing system or software program. To address this, some computing systems provide the ability to generate and log traces and other messages or information on a client computing device. For instance, a trace listener can be set up on a client computing device to receive information from a trace source. The trace source may be an object or other item in a software program or component. The trace may indicate information such as the state of the object in the program flow, how the program flow progressed, and other information. The trace can be logged or stored on the client device. Similarly, error messages indicative of detected errors can also be logged along with a variety of other information.

When a user encounters an issue, the user often contacts a support engineer in order to address the issue. The support engineer may request the user to send the logged information (the stored traces, error messages, etc.) in an attempt to identify and address the issue. The engineer may also ask the user to attempt to reproduce the issue, in an attempt to address the issue. This is all quite time consuming and can be cumbersome and bothersome to the user.

The discussion above is merely provided for general background information and is not intended to be used as an aid in determining the scope of the claimed subject matter.

SUMMARY

Trace information representing a program object is automatically logged on a client computing system. It is uploaded to a service computing system where it is configured to be searchable on a property-by-property basis.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 4A-4C show examples of user interface displays.

DETAILED DESCRIPTION

Figure 1:
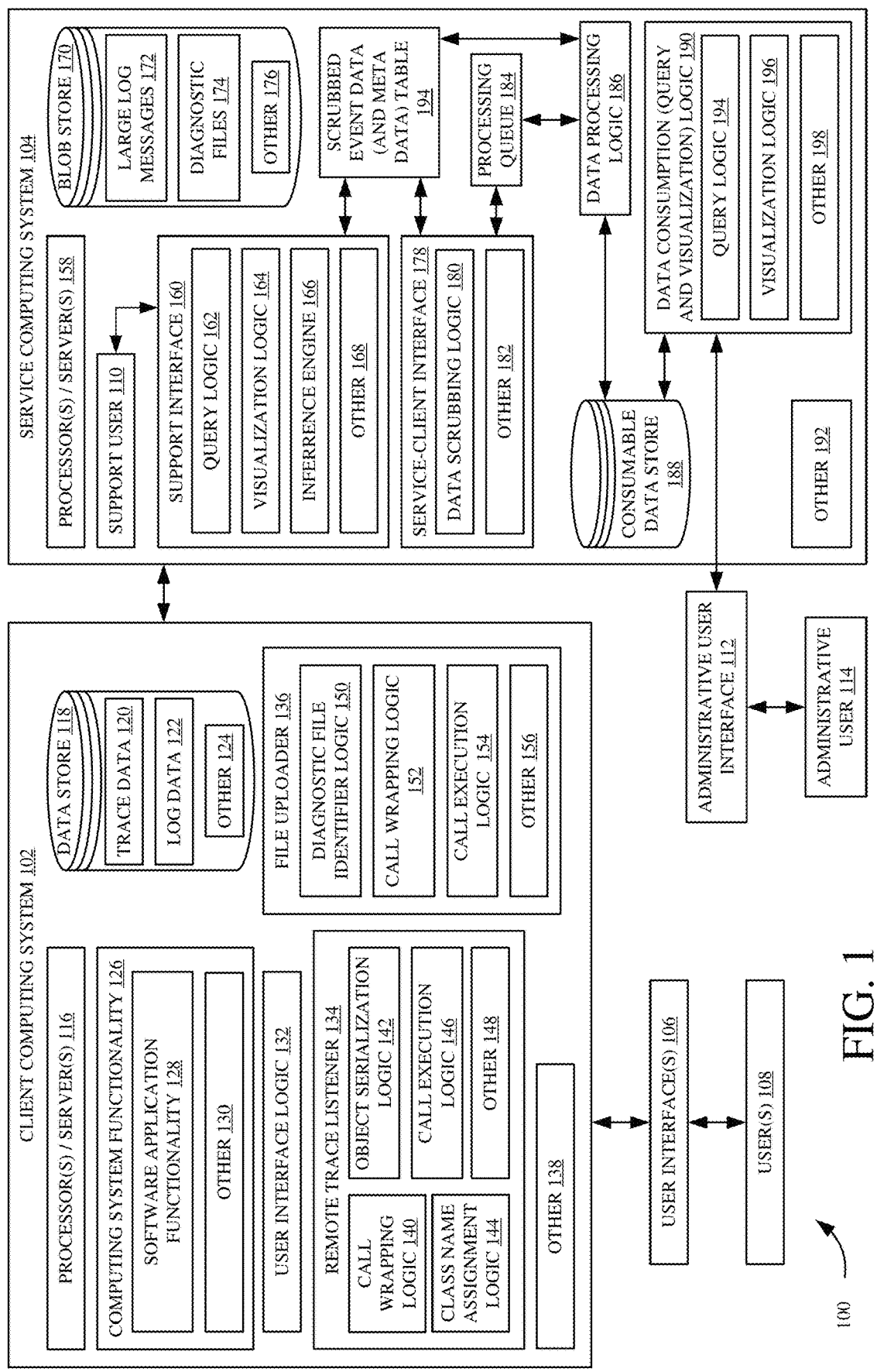
FIG. 1 is a block diagram of one example of a computing system architecture.

FIG. 1 is a block diagram of one example of a computing system architecture 100. In the example shown in FIG. 1, architecture 100 illustratively includes one or more client computing systems 102 that are coupled for communication with a service computing system 104. FIG. 1 shows that client computing system 102 illustratively generates user interfaces 106 that can have user input mechanisms for interaction by users 108. Users 108 illustratively interact with user input mechanisms on user interface 106 in order to control and manipulate client computing system 102 and, ultimately, service computing system 104.

FIG. 1 also shows that service computing system 104 can generate an interface for interaction by a support user 110 (which may be a support engineer or another type of support user that can assist users 108 with issues that they encounter with client computing system 102 or service computing system 104). Support user 110 can illustratively interact with a support user interface in order to control and manipulate service computing system 104 so that support user 110 can identify log and trace information received from client computing system 102, to assist user 108 in addressing an issue.

FIG. 1 also shows that, in one example, service computing system 104 can generate an administrative user interface 112 that has user input mechanisms for interaction by administrative user 114. Administrative user 114 may be a system administrator for a tenant with which client computing system 102 is a member. In one example, administrative user 114 can interact with the user input mechanisms on administrative user interface 112 in order to control and manipulate service computing system 104.

Client computing system 102 illustratively includes one or more processors or servers 116, data store 118 (that can store trace data 120, log data 122 and a wide variety of other information 124) computing system functionality 126 (that, itself, can include software application functionality 128 and other items 130), user interface logic 132, remote trace listener 134, file uploader 136, and it can include other items 138. Remote trace listener 134 can be configured on client computing system 102 to listen to trace information sources (such as program objects that operate and/or are operated on to carry out software application functionality 128 or other things) and wrap the trace information in a call which can be uploaded to service computing system 104. Thus, in one example, remote trace listener 134 can include call wrapping logic 140, object serialization logic 142, class name assignment logic 144, call execution logic 146, and it can include other items 148.

File uploader 136 can be configured on client computing system 102 to identify diagnostic files or other information that can be logged, and that is related to the operation of client computing system 102. File uploader 136 illustratively wraps that information in a call to service computing system 104 to upload the information to service computing system 104. Therefore, in one example, file uploader 136 can include diagnostic file identifier logic 150, call wrapping logic 152, call execution logic 154, and it can include other items 156. Remote trace listener 134 and file uploader 136 can also be configured to store trace data 120 and log data 122 in local data store 118 on client computing system 102.

In the example shown in FIG. 1, service computing system 104 illustratively includes one or more processors or servers 158, support interface 160 (which can include query logic 162, visualization logic 164, inference engine 166, and other items 168. Service computing system 104 also illustratively includes blob store 170 (which can store large log messages 172 and the uploaded diagnostic files 174, along with other items 176), service-client interface 178 (which can include data scrubbing logic 180 and other items 182), processing queue 184, data processing logic 186, consumable data store 188, data consumption (query and visualization) logic 190, and it can include other items 192. Before describing the operation of architecture 100 in more detail, a brief overview of some of the items in architecture 100, and their operation, will first be provided.

When service-client interface 178 receives information uploaded by remote trace listener 134 or file uploader 136, data scrubbing logic 180 illustratively scrubs the data (by identifying and removing personally identifiable information) and provides it as scrubbed event data 194. Data 194 can also include metadata for any diagnostic files 174 or large log messages 172 that are stored in blog store 170. An entry is also placed in processing queue 184 for the uploaded, scrubbed event data 194 and that data is processed, as it comes up in queue 184, by data processing logic 186.

Data processing logic 186 can perform a wide variety of different types of analytics on the scrubbed data and illustratively converts it into consumable data, that is consumable by data consumption logic 190. The consumable data may be data that is re-organized so it conforms to a pre-defined schema (or schematized data). Data processing logic 186 then stores the analyzed and schematized data in consumable data store 188. Then, when administrative user 114 wishes to access the data, he or she can do so through administrative user interfaces 112 generated by data consumption logic 190.

In one example, logic 190 includes query logic 194, visualization logic 196, and it can include other items 198. Query logic 194 illustratively allows administrative user 114 to query the data in consumable data store 188 on a property-by-property basis for the various program objects represented in consumable data store 188. Thus, the administrative user can use the individual properties of various objects as filters in searching data store 188. Visualization logic 196 illustratively generates a visualization of the search results generated by query logic 194 and surfaces those through administrative user interface 112 for administrative user 114.

In one example, the visualization has user input mechanisms with which administrative user 114 can interact. For instance, administrative user 114 may interact with the user input mechanisms in order to pivot the data based on different criteria, or in order to drill down into a more detailed representation of the data or drill up to a more general representation of the data. The administrative user 114 may add additional properties to the query, actuate a link to navigate to a different representation of a given object or other search result, or administrative user 114 may interact with the visualization in a wide variety of other ways as well.

Support interface 160 provides an interface into the scrubbed event data 194 (which may also be stored in a separate store accessible by support interface 160) and the data in blob store 170 for support user 110. Query logic 162 illustratively surfaces a search interface that allows support user 110 to query the data on a per-property basis, on a per-tenant basis, on a per-user and per-session basis, etc. Visualization logic 164 illustratively generates a user interface representation that represents the search results identified by query logic 162 and surfaces that representation for support user 110. Again, the visualization may include user input mechanisms that allow support user 110 to interact with the representation of the search results, such as to add filter inputs (e.g., additional properties), such as to pivot the data based on various criteria, such as to drill into or out of the data, navigate to other visualizations, etc. Thus, support user 110 can quickly identify the state of client computing system 102 when user 108 has an issue. This greatly enhances the computer system by giving a support user 110 the ability to quickly identify and address issues that user 108 is experiencing on client computing system 102.

Inference engine 166 illustratively generates a machine learned estimate of an issue that user 108 may be experiencing, based upon the information surfaced for support user 110. Inference engine 166 can be any of a wide variety of different types of machine learning engines that maps client information to issues that a user of the client computing system may be experiencing. This can also assist support user 110 in identifying issues and potential remedial actions that can be taken. Inference engine 166 may also output an estimate of the remedial actions that can be taken and may, in fact, generate control signals to automatically take some or all of those actions.

Figure 2:
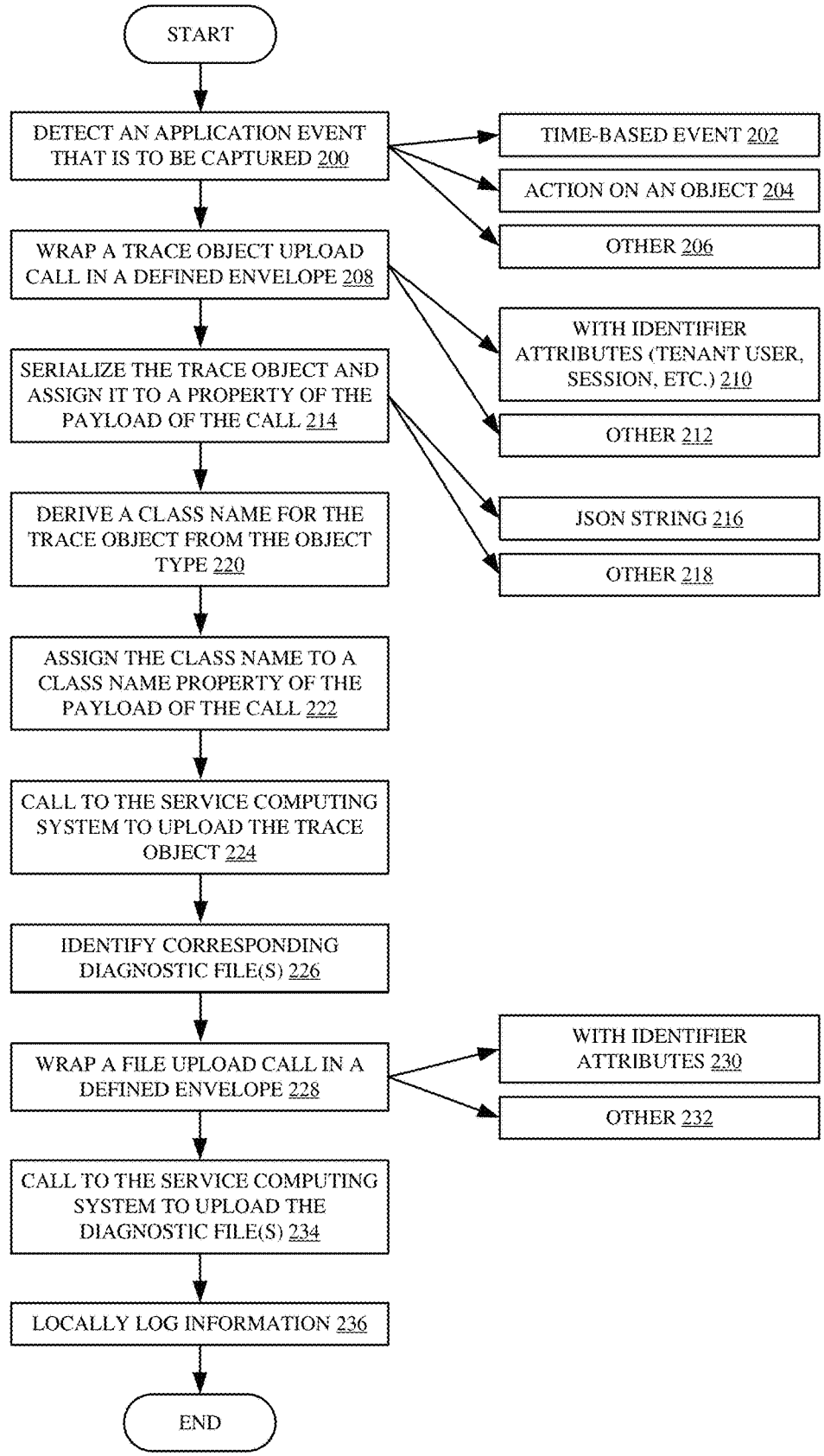
FIG. 2 is a flow diagram illustrating one example of the operation of the architecture shown in FIG. 1 in performing processing on a client computing system and sending log and trace information to a server computing system.

FIG. 2 is a flow diagram illustrating one example of the operation of client computing system 102 (and particularly remote trace listener 134 and file uploader 136) in generating calls to service computing system 104 with trace information and diagnostic files. It is first assumed that remote trace listener 134 and file uploader 136 are configured on client computing system 102 in order to upload information to service computing system 104 based on one or more events. Thus, in one example, remote trace listener 134 illustratively detects an application event that is to be captured by trace information or other information. This is indicated by block 200 in the flow diagram of FIG. 2. By way of example, it may be that remote trace listener 134 and file uploader 136 are configured to store trace and log information locally and to upload the information to service computing system 104 periodically based on a timer or on another time-based event. This is indicated by block 202. When the desired time has passed, then remote trace listener 134 and file uploader 136 can upload any information to service computing system 104. This upload can also be triggered by one or more different actions on one or more different program objects in software application functionality 128. For instance, where an object is modified, saved, deleted, etc., it may be that these types of events trigger remote trace listener 134 and/or file uploader 136 to locally store, and upload information. Detecting an action on an object in this way is indicated by block 204. Detecting an application event that is to be captured can be done in a wide variety of other ways as well, and this is indicated by block 206.

Remote trace listener 134 then generates a trace object that is to be uploaded to service computing system 104. Call wrapping logic 140 wraps the trace object in an upload call that has a defined envelope. This is indicated by block 208. For instance, it can wrap the trace object upload call with identifier attributes (such as a tenant identifier, a user identifier, a session identifier, or a wide variety of other identifier attributes). This is indicated by block 210. The identifier properties identify the tenant, user, session, etc. that spawned the trace object (e.g., that used the program object that is the subject of the trace object). It can wrap the call in other ways as well, and this is indicated by block 212.

Object serialization logic 142 then serializes the program object and assigns it to a property of the payload in the trace object upload call. This is indicated by block 214. In one example, it serializes the program object into a JSON string as indicated by block 216. It can assign it to a ClassJSON property of the payload in the call. It can serialize the object and assign it to a property of the payload in other ways as well, and this is indicated by block 218.

Class name assignment logic 144 then derives a class name for the program object from the object type. This is indicated by block 220. It assigns the class name to a ClassName property of the payload of the trace object upload call, and this is indicated by block 222.

It can thus be seen in the example described, the ClassJSON and the ClassName properties of each payload greatly enhance the ability of the data to be identified through searching, and visualized, by administrative user 114 and support user 110.

Call execution logic 146 then executes the call to the service computing system to upload the trace object. This is indicated by block 224.

Table 1 below shows one example of a call that can be made by remote trace listener 134 to an application programming interface (API) exposed by service-client interface 178 at service computing system 104, in order to upload a trace object.

TABLE 1

Sample call
RemoteTrace.Source.TraceData(
    TraceEventType.Information,
    0,
    new Feedback
    {
        CanContact = this.CanContactValue,
        Comments = this.FeedbackValue,
        HelpfulRating = (int)this.HelpfulRatingValue,
        StarRating = this.RatingValue        });

In the example shown in Table 1, it can be seen that any serializable object can be uploaded in this form. Queries can then be generated based on the object name or object type, the properties or property values corresponding to the object, for any or all properties of the object.

Diagnostic file identifier logic 150 can also identify any diagnostic files corresponding to the trace object upload call. This is indicated by block 226. Call wrapping logic 152, like call wrapping logic 140, wraps the file upload call in a defined envelope. This is indicated by block 228. The defined envelope can include identifier attributes 230, and a wide variety of other information 232. The identifier attributes can include tenant, user and session identifiers corresponding to the diagnostic files and/or other identifiers.

Call execution logic 154 then executes the call to an API exposed by service computing system 104 in order to upload the diagnostic files through service-client interface 178. This is indicated by block 234 in the flow diagram of FIG. 2.

Table 2 shows one example of such a call.

TABLE 2

Sample Call
var fileUploader = new FileUploader( );
fileUploader.UploadFile(fileName);

In one example, as discussed above, remote trace listener 134 and file uploader 136 (or other items in client computing system 102) also store the trace data and log data locally in data store 118. This can be done to accumulate such data locally between uploads to service computing system 104 or it can be done in other ways. This is indicated by block 236 in the flow diagram of FIG. 2.

Figure 3:
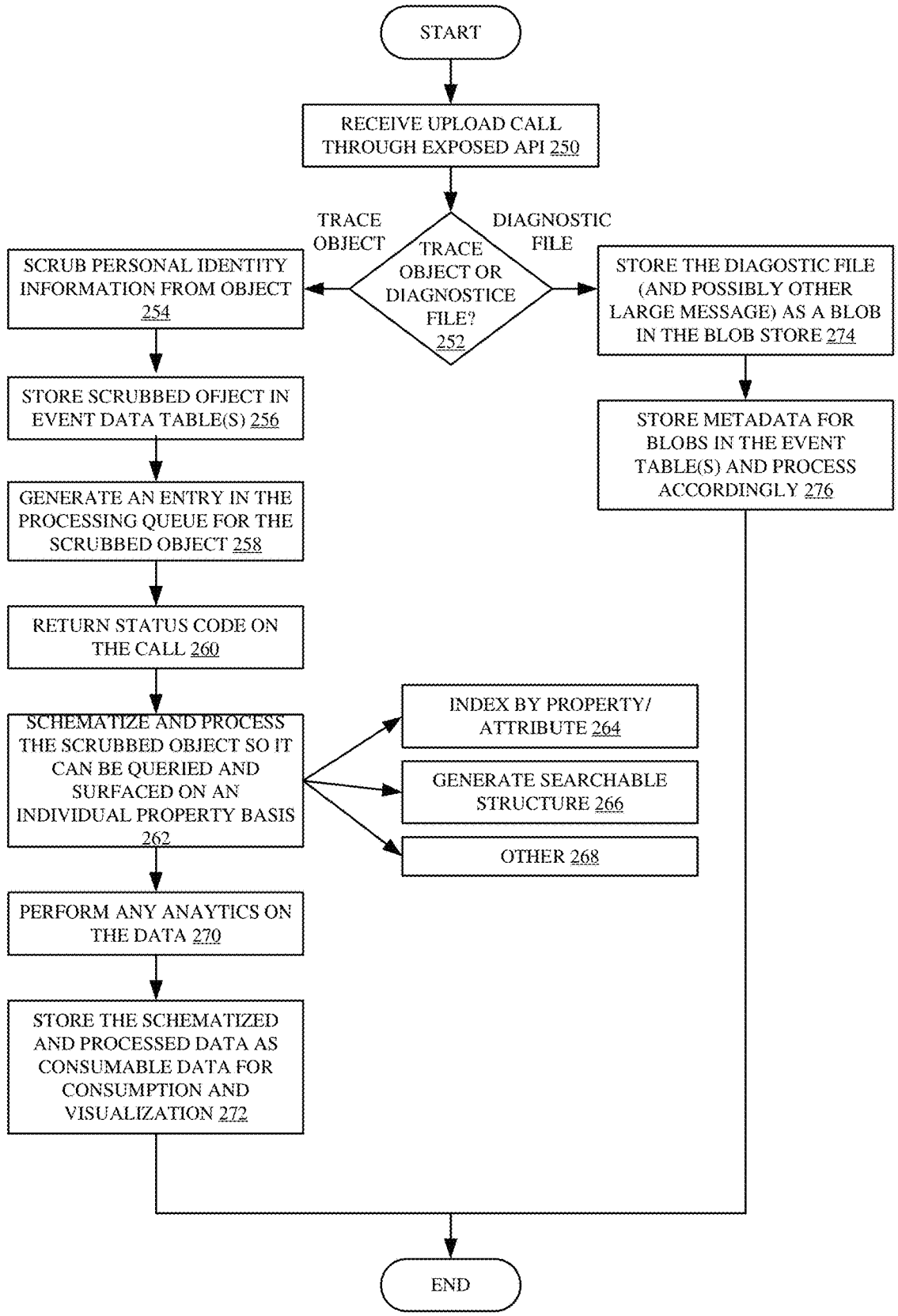
FIG. 3 is a flow diagram illustrating the operation of the server computing system shown in FIG. 1 in processing received log and trace information.

FIG. 3 is a flow diagram illustrating one example of the operation of service computing system 104 in receiving and storing log and trace information from client computing system 102 for access by support user 110 and administrative user 114. Service-client interface 178 illustratively exposes an API through which the calls from remote trace listener 134 and file uploader 136 are received. It receives an upload call through the exposed API, and this is indicated by block 250 in the flow diagram of FIG. 3. Based on the call, service-client interface 178 determines whether the upload call contains a trace object or a diagnostic file. This is indicated by block 252. If it includes a trace object, then data scrubbing logic 180 illustratively scrubs any personal identity information from the object. This is indicated by block 254. For instance, the object may include such things as a user's e-mail address, telephone number, etc. This type of information is identified by data scrubbing logic 180 and removed or replaced with a string that does not identify the user.

Data scrubbing logic 180 then stores the scrubbed event data in scrubbed event data (and metadata) tables 194. This is indicated by block 256 in the flow diagram of FIG. 3. It also generates an entry in processing queue 184 corresponding to the uploaded trace object. This is indicated by block 258. Service-client interface 178 then returns a status code on the call, to the calling component (e.g., to the remote trace listener 134 or file uploader 136). This is indicated by block 260 in the flow diagram of FIG. 3.

Based on the order of the entries in processing queue 184, data processing logic 186 retrieves scrubbed event data from tables 194 and performs any further processing on that data. For instance, it can schematize and process the scrubbed objects so it can be queried and surfaced on an individual property-by-property basis. This is indicated by block 262. It can, for example, index the trace object by property or attribute, or by property or attribute values, etc. This is indicated by block 264. It can also generate one or more other searchable structures for searching the trace object on a property-by-property basis using data consumption logic 190. This is indicated by block 266. For instance, logic 190 may be a third party searching system or data visualization system. Thus, processing logic 186 re-organizes the scrubbed event data based on a pre-defined schema (e.g., schematizes the data) so it can be searched by data consumption logic 190. Thus, the particular schematization may vary based upon the particular data consumption logic 190 that is used. Data processing logic 186 can perform a wide variety of other processing, such as performing data analytics, such as aggregating and pivoting the data based on various criteria, or a wide variety of other processing. This is indicated by block 268.

It also illustratively performs data analytics on the data. This is indicated by block 270. The schematized and processed data is then stored as consumable data in consumable data store 188. The data is stored so that it can be consumed (e.g., represented, visualized and interacted with) by data consumption logic 190. This is indicated by block 272 in the flow diagram of FIG. 3.

If, at block 252, it is determined that the call to upload information includes a diagnostic file (or in some examples, a large event message), then service-client interface 178 illustratively stores the payload information in binary large object (blob) store 170. This is indicated by block 274 in the flow diagram of FIG. 3. It can also store metadata for blobs in the event tables 194 and process them accordingly, as described above with respect to blocks 254-272. This is indicated by block 276. At this point, it will be noted that trace information and diagnostic files (or other log data) has now been stored in scrubbed event data tables 194, consumable data store 188 and blob store 170, for access by administrative user 114 and support user 110.

Figure 4:
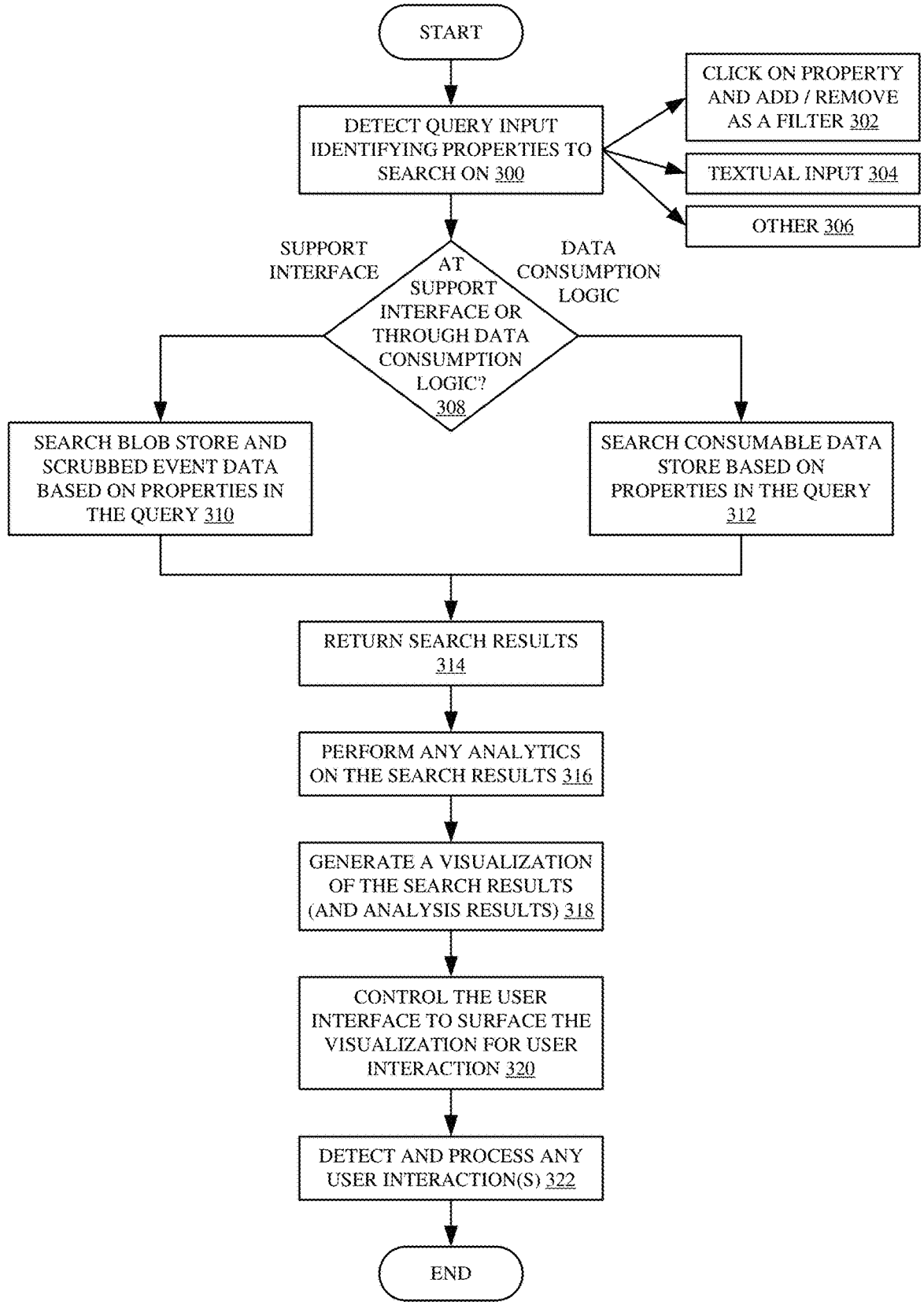
FIG. 4 is a flow diagram illustrating the operation of the architecture shown in FIG. 1 in generating and surfacing interfaces to the log and trace information.

FIG. 4 is a flow diagram illustrating one example of the operation of support interface 160 and/or data consumption logic 190 in allowing users to query the stored data and in generating a representation of the search results for visualization and interaction by the users. In one example, either support interface 160 or data consumption logic 190 detects a query input identifying properties to search on in the various data stores in service computing system 104. This is indicated by block 300 in the flow diagram of FIG. 4. For instance, a user may click on a property from a list of properties and add it, or remove it, as a filter input for searching the data. This is indicated by block 302. A user may provide a textual input or another type of input identifying a property or filter input as indicated by blocks 304 and 306, respectively. If the query input is input by support user 110 at support interface 160 (as determined at block 308), then query logic 162 illustratively searches blob store 170 and scrubbed event data tables 194 based on the properties in the query input by support user 110. This is indicated by block 310.

If, on the other hand, the query input is provided by administrative user 114 to data consumption logic 190, then query logic 194 in data consumption logic 190 searches consumable data store 188 based upon the properties in the query. This is indicated by block 312. The corresponding query logic (either query logic 162 or query logic 194) then returns search results based on the query. This is indicated by block 314. In one example, the search results may identify the state of different objects returned in the search results. The search results can include the results of any analytics that were performed on those objects or on other data, or it can include a wide variety of other items.

Visualization logic 164 or visualization logic 196 can also perform any additional analytics on the search results. This is indicated by block 316. For instance, they can aggregate and pivot the data represented by the search results in various ways so that different types of visualizations, and user input mechanisms, can be generated to represent the search results. The visualization logic then generates a visualization of the search results (and any analysis results) for interaction by the corresponding user. This is indicated by block 318.

Visualization logic 164 or visualization logic 196 then controls user interface logic to surface the visualization for user interaction. This is indicated by block 320. It then detects and processes any user interactions with the surfaced information. This is indicated by block 322. As discussed above, this can include such things as drilling further into, or further out of, the data represented by the visualization. It can include pivoting the data based on various criteria. It can include adding or removing object properties as filters and refining the search based on the added or removed properties. It can include navigating to different visualizations, and it can include a wide variety of other user interactions as well.

Figure 4A:
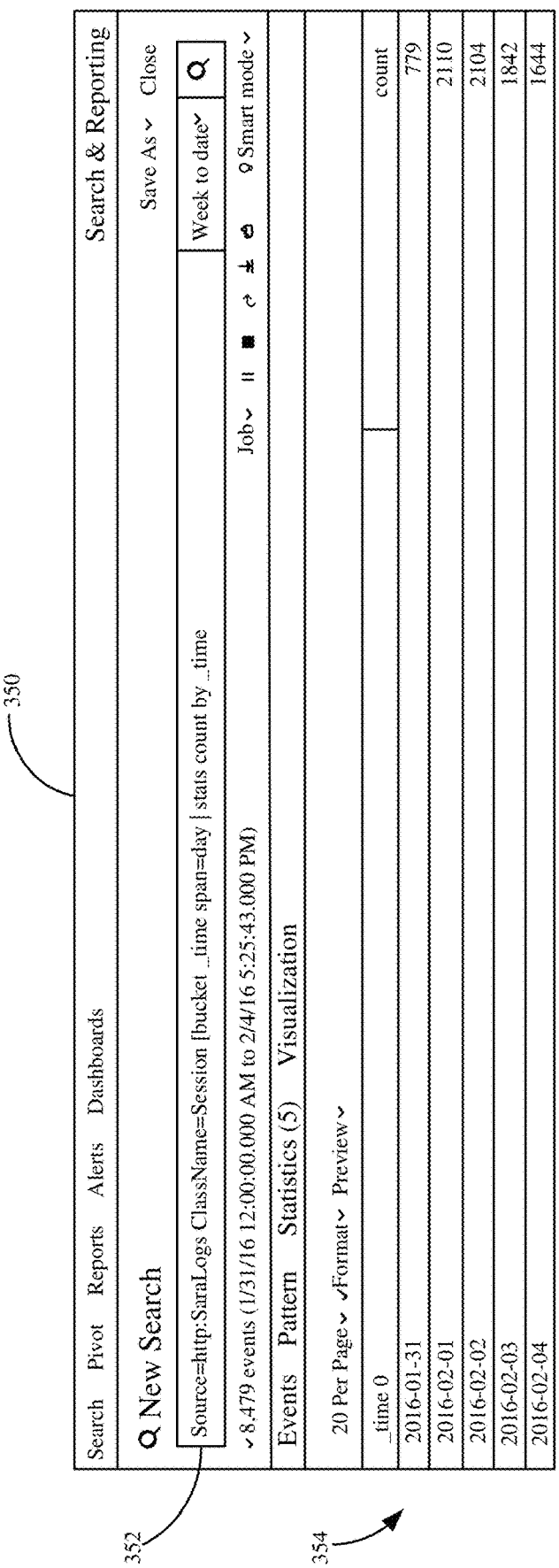

FIG. 4A shows one example of a user interface display 350 that can be generated by data consumption logic 190 based on a query, one example of which is described below in Table 3.

TABLE 3 source=http:SaraLogs ClientName=SaraClient ClassName=Session
|bucket _time span=day
|stats count by _time Table 3 shows a query to obtain a day-wise count of session objects. The query is entered into search box 352 on display 350 and the search results are displayed in tabular form generally at 354. The search results show the number of times that a certain part of the client computing system 102 (such as a certain part of software application functionality 128) was invoked on a day-by-day basis.

FIG. 4B shows another user interface display 356 that can be generated by data consumption logic 190, based upon a query as shown in Table 4 below.

TABLE 4 source=http:SaraLogs ClientName=SaraClient ClassName=SaraException ClientVersion=16.00.1097.*

The query shown in Table 4 obtains exception objects for a particular build (1097) of the client computing system 102. It shows the most frequently faulting methods that are returned through the query shown in Table 4.

Figure 4C:
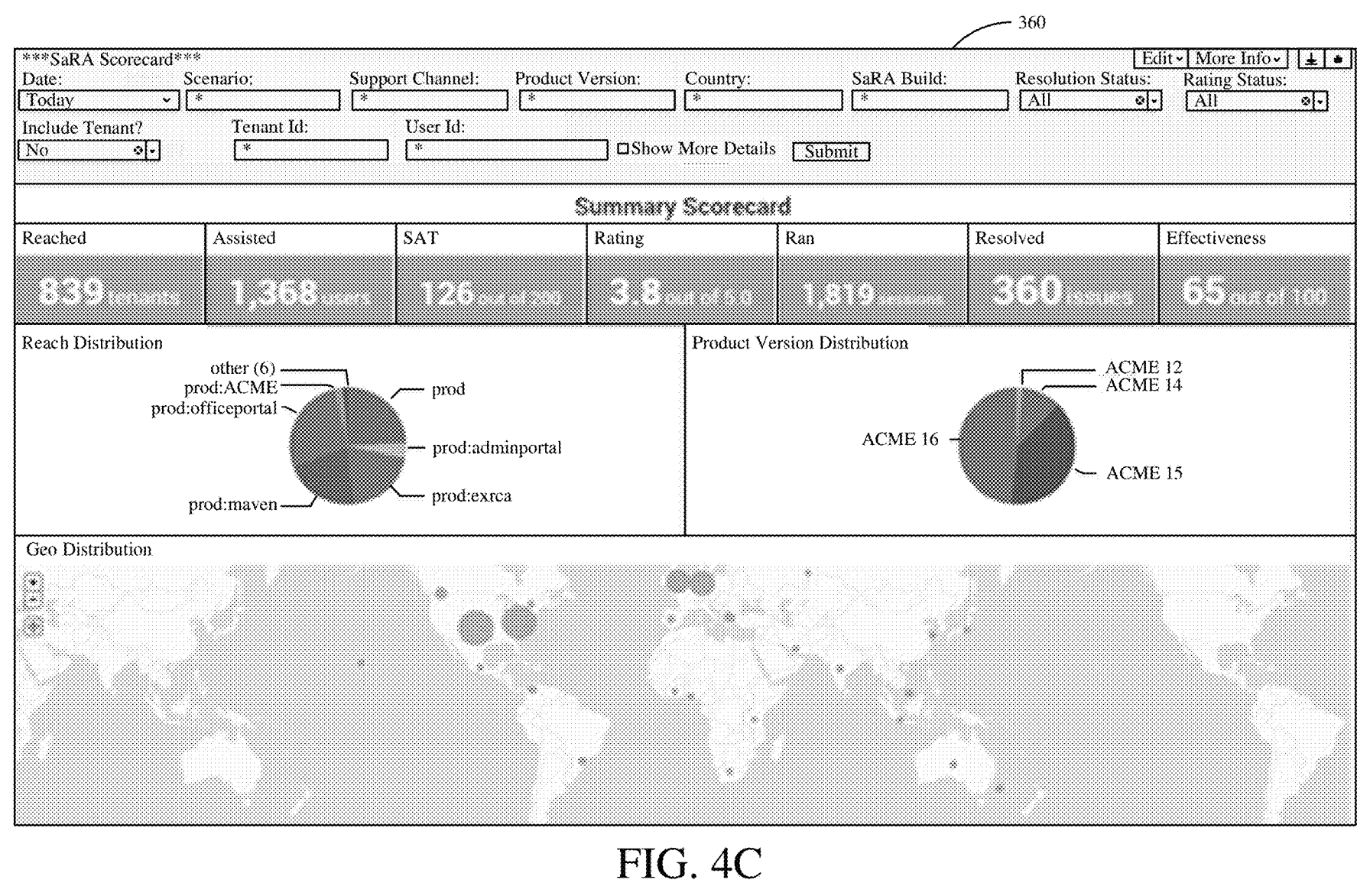

FIG. 4C shows yet another example of a user interface display 360. User interface display 360 is generally in the form of a dashboard display that can be pre-populated by data consumption logic 190 as the data is uploaded by various client computing systems. In the example shown in FIG. 4C, display 360 shows a variety of metrics as distributed over a geographical region, over a software version, in terms of the number of tenants/users and the number of issues resolved. It also displays a metric indicative of overall effectiveness and overall rating for issues addressed. It will be appreciated that display 360 shows just one example of a pre-defined dashboard display that can be generated by either data consumption logic 190 or support interface 160. A wide variety of other or different types of dashboards can be pre-defined and/or pre-computed, and they can include a wide variety of other metrics as well.

It can thus be seen that the present description not only aggregates and stores trace and log information locally, but it also automatically uploads it to a remote service computing system 104. The system 104 processes the data so that it can be consumed and surfaced for user interaction by a variety of different types of users. Since the trace and log information is stored on the remote service computing system 104, and since it is stored in a schema which permits the data to be searched on a property-by-property basis for various objects operating in the client computing system, the present description provides a much enhanced computing system over prior systems, where some data was only stored locally. In those systems, when a user experienced an issue, it was very cumbersome and difficult for the user to locate and upload all of the trace and log information that would be used by an administrative user or a support user to address the issue. Instead, as presently described, the trace and log information is already uploaded and is queriable on a very fine granularity (on a property-by-property basis for the objects stored) so that the administrative user or support user can easily access the data to address issues. The administrative user or support user can also much more quickly identify the issue and often need not have the user attempt to reproduce the issues. All of these greatly enhance the operation and reliability of the computing system itself, and also greatly enhance the user experience when an issue is encountered.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 5:
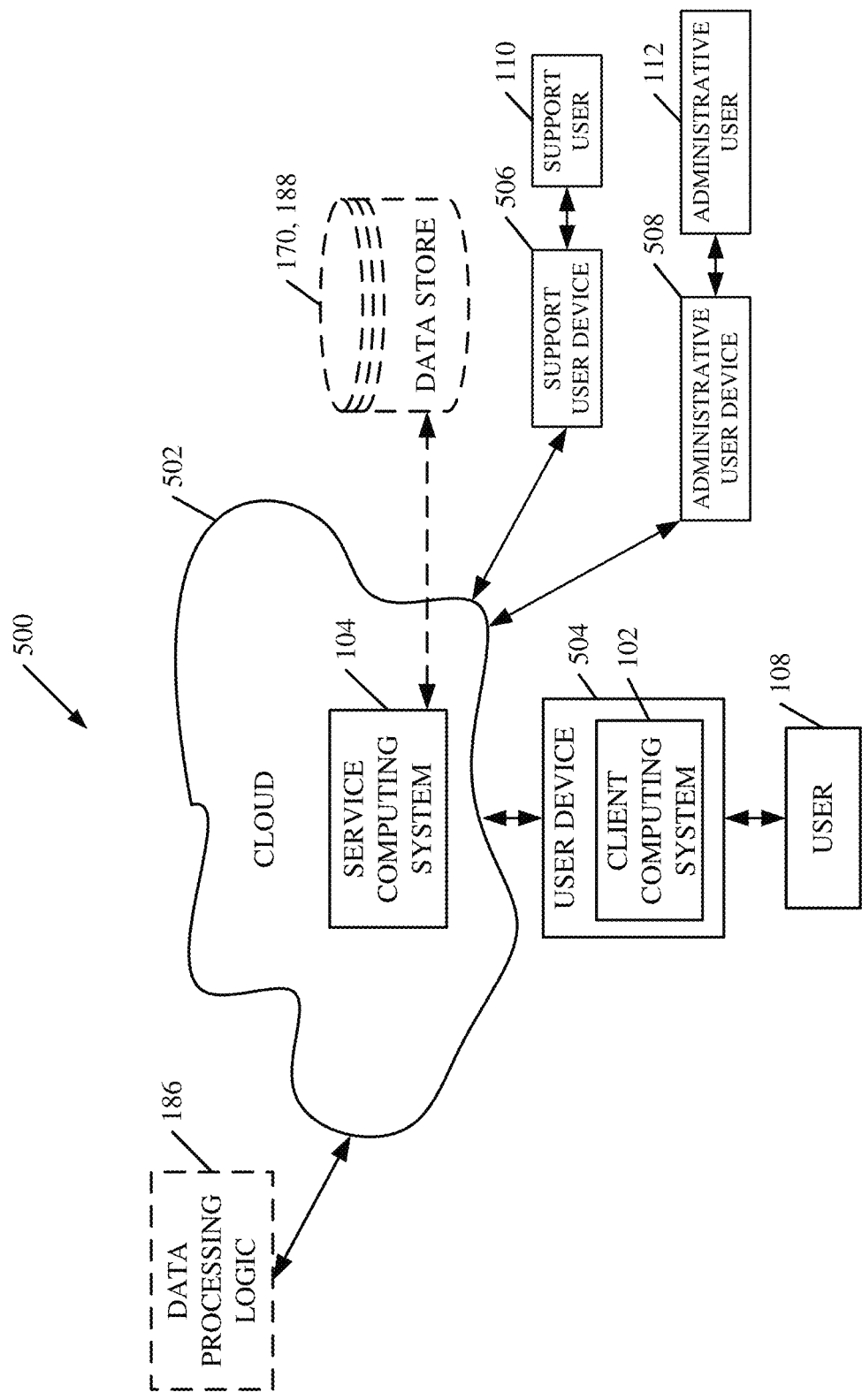
FIG. 5 is a block diagram showing one example of the architecture illustrated in FIG. 1, deployed in a cloud computing architecture.

FIG. 5 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 5, some items are similar to those shown in FIG. 1 and they are similarly numbered. FIG. 5 specifically shows that service computing system 104 can be located in cloud 502 (which can be public, private, or a combination where portions are public while others are private). Therefore, users 108, 110 and 112 use user devices 504, 506 and 508 to access those systems through cloud 502.

FIG. 5 also depicts another example of a cloud architecture. FIG. 5 shows that it is also contemplated that some elements of computing system 104 can be disposed in cloud 502 while others are not. By way of example, data stores 170 and 188 can be disposed outside of cloud 502, and accessed through cloud 502. In another example, data processing logic 186 can be outside of cloud 502. Regardless of where they are located, they can be accessed directly by devices 504, 506 and 508, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
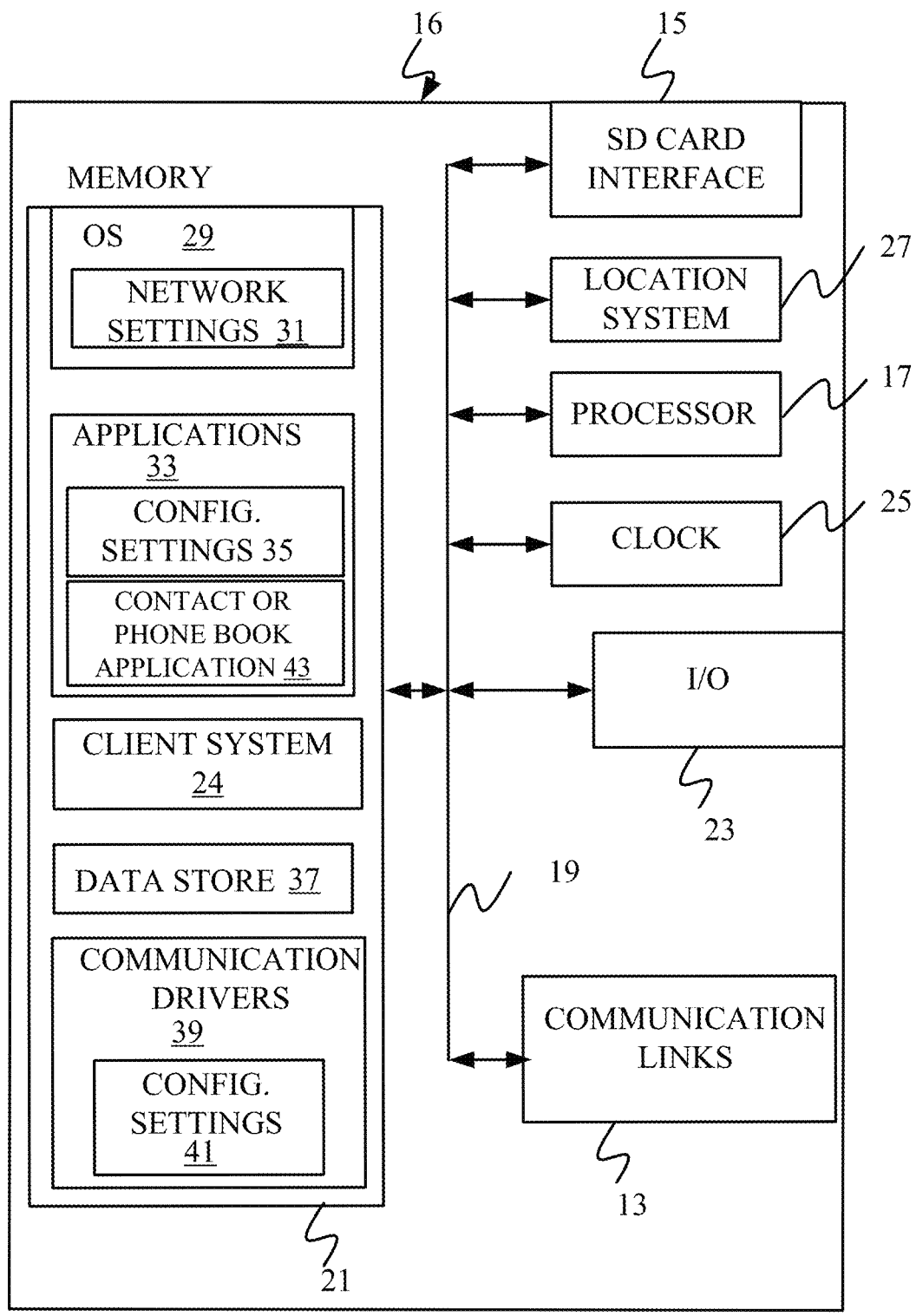
FIGS. 6-8 show examples of mobile devices that can be used in the architectures shown in the previous figures.
Figure 7:
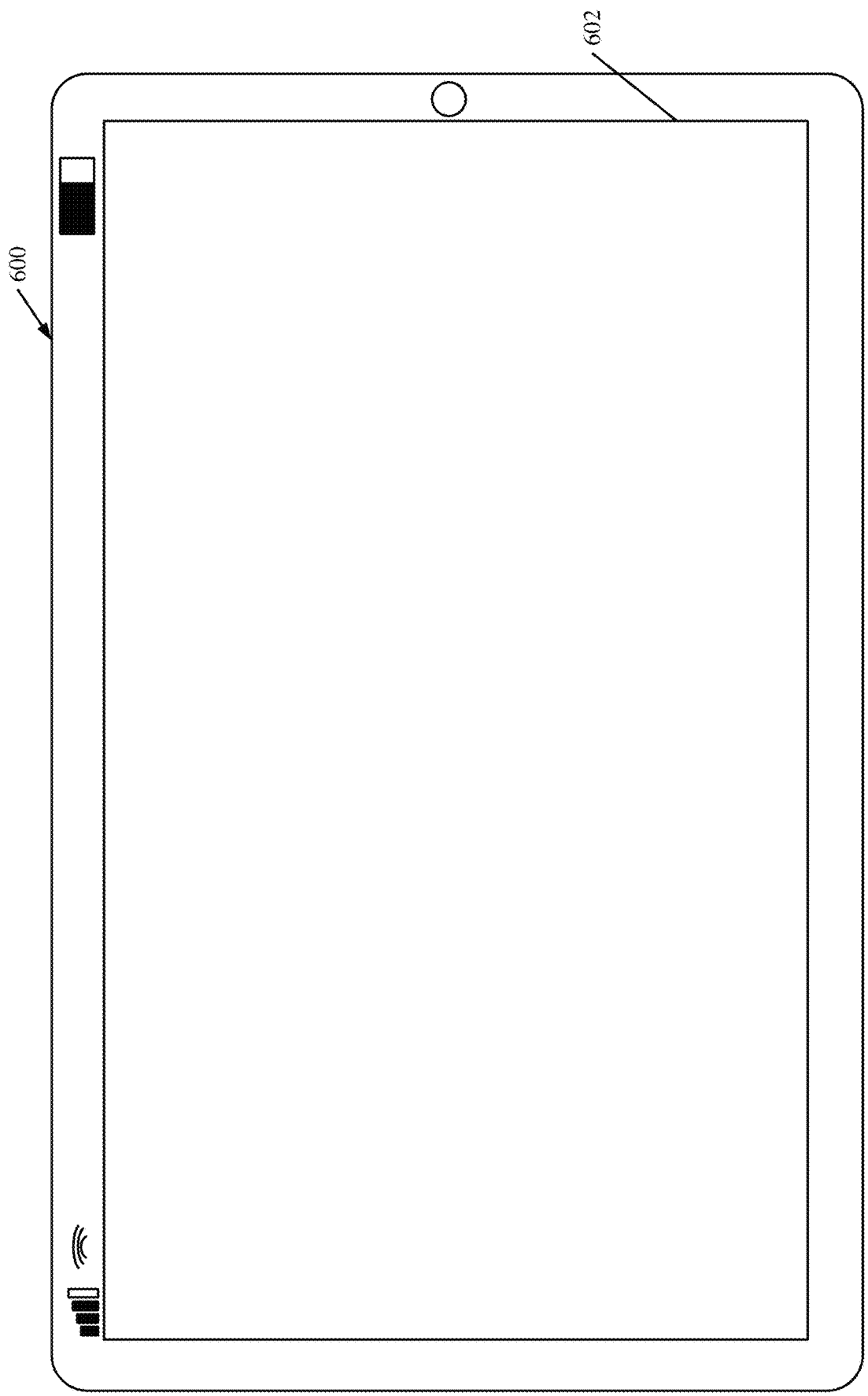
Figure 8:
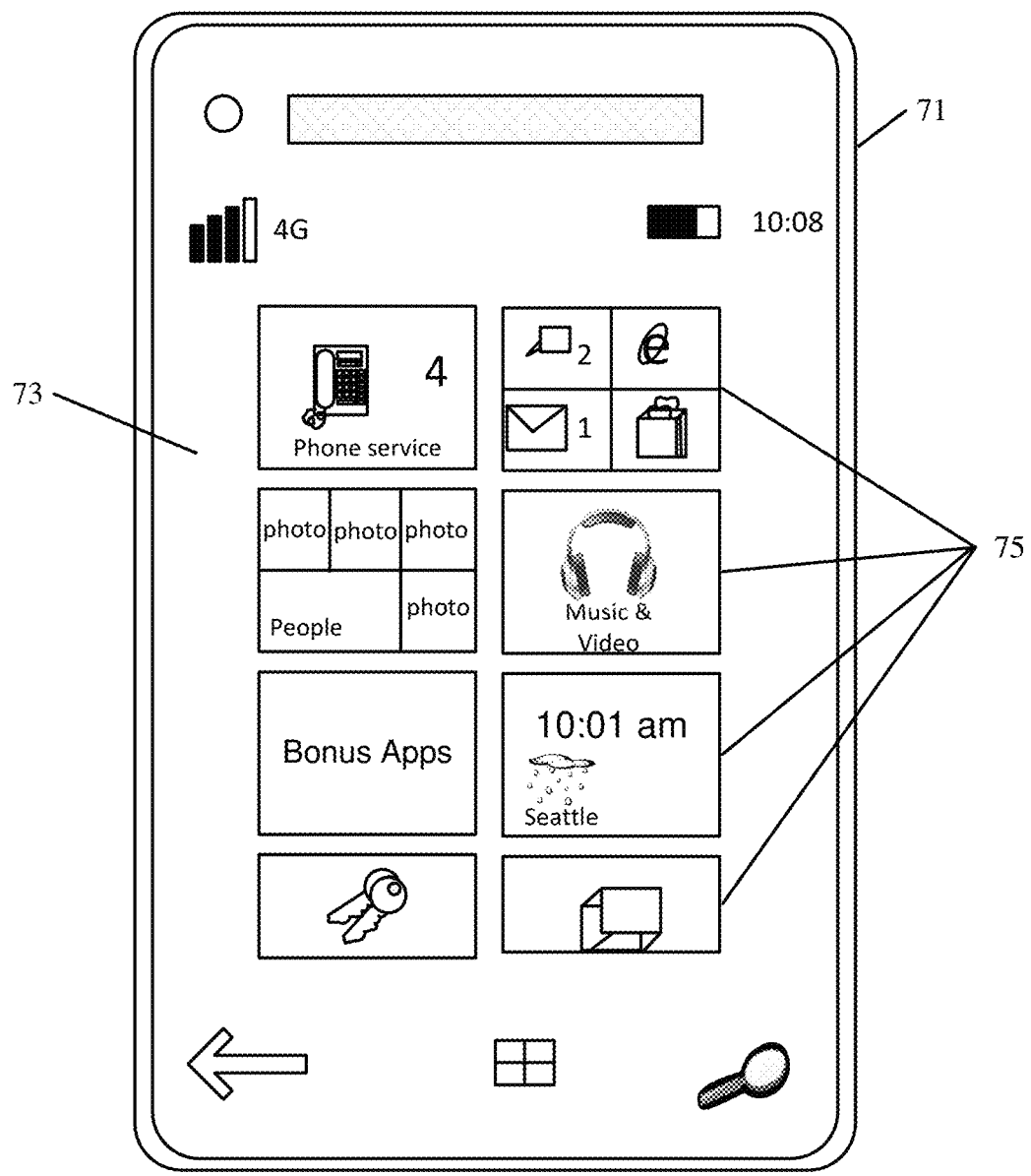

FIG. 6 is a simplified block diagram of one illustrative example of a handheld or mobile computing device that can be used as a user's or client's hand held device 16, in which the present system (or parts of it) can be deployed. FIGS. 7-8 are examples of handheld or mobile devices.

FIG. 6 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors 116 or 158 from FIG. 1 or those on devices 504, 506 or 508) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications or embody parts or all of client computing system 102. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 7 shows one example in which device 16 is a tablet computer 600. In FIG. 7, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 8 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 9:
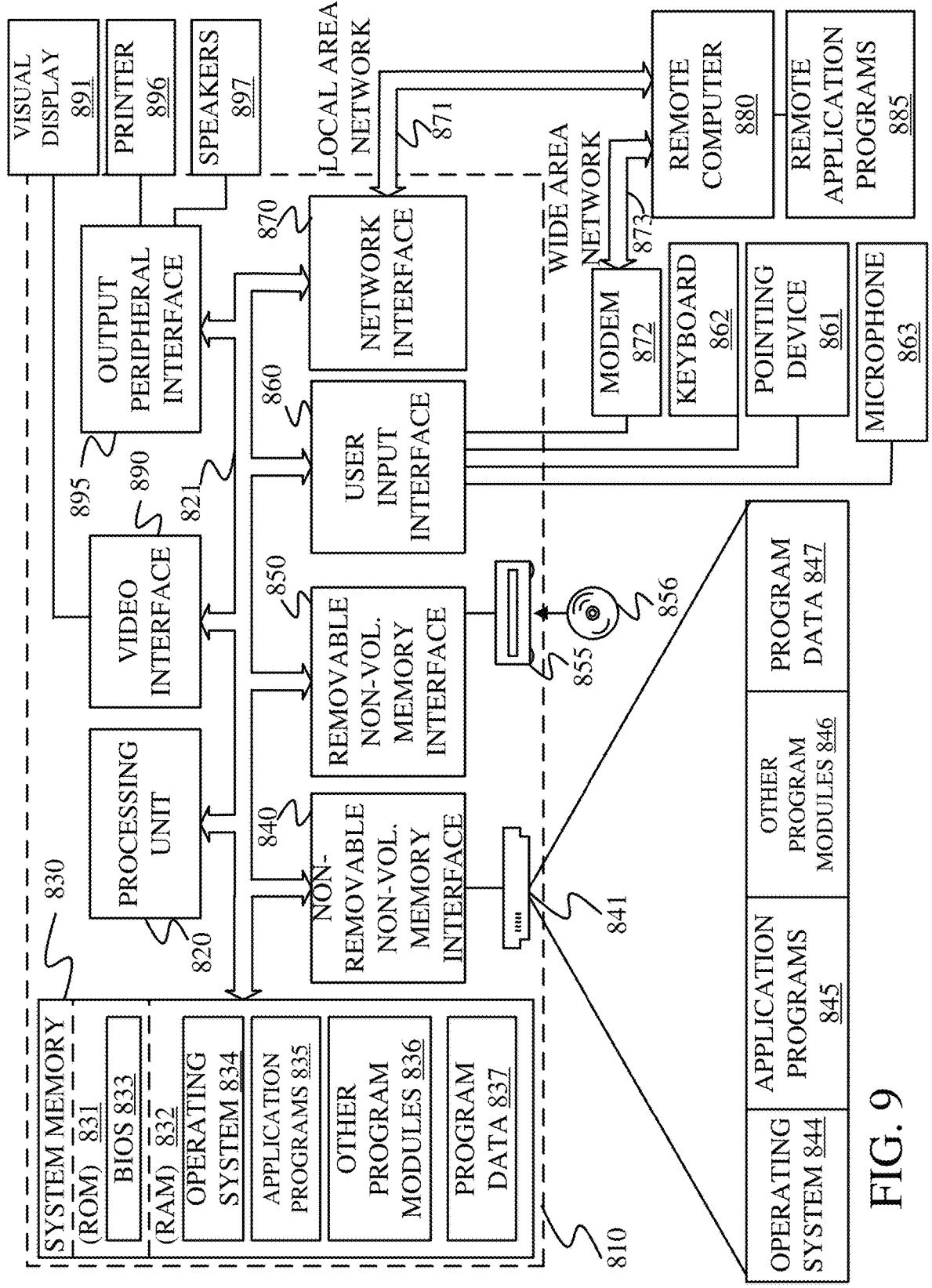
FIG. 9 is a block diagram of one example of a computing environment that can be used in the architectures shown in the previous figures.

FIG. 9 is one example of a computing environment in which architecture 100, or parts of it, (for example) can be deployed. With reference to FIG. 9, an example system for implementing some embodiments includes a general-purpose computing device in the form of a computer 810. Components of computer 810 may include, but are not limited to, a processing unit 820 (which can comprise processor 116 or 158 from FIG. 1 or those in any of the other devices discussed), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 9.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837.

The computer 810 may also include other removable/non-removable volatile/nonvolatile computer storage media. By way of example only, FIG. 9 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 9, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 9 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 9 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:

service interface logic that exposes an application programming interface that receives a trace object upload call from a client computing system, the trace object upload call including a trace object representing a state of a program object, as it is processed through a program flow on the client computing system;

data processing logic that organizes the trace object according to a predefined schema to generate a schematized trace object and stores the schematized trace object as consumable data that can be searched on a property-by-property basis, based on properties of the program object; and data consumption logic that exposes a search interface that receives an input query indicative of a set of properties and filters the consumable data to generate search results based on the set of properties in the input query.

Example 2 is the computing system of any or all previous examples wherein the service interface logic comprises:
a scrubbed event data structure; and
data scrubbing logic configured to identify and remove personal identity information in the trace object, to generate scrubbed trace object data, before it is organized by the data processing logic, and being further configured to store the scrubbed trace object data in the scrubbed event data structure for access by the data processing logic.

Example 3 is the computing system of any or all previous examples and further comprising:
a processing queue, the service interface logic being configured to generate an entry in the processing queue corresponding to the scrubbed trace object data, the data processing logic being configured to process the scrubbed trace object data based on the corresponding entry in the processing queue.

Example 4 is the computing system of any or all previous examples wherein the data consumption logic comprises:
query logic configured to expose the search interface and filter the consumable data based on the set of properties.

Example 5 is the computing system of any or all previous examples wherein the data consumption logic comprises:
visualization logic configured to generate a visualization of the search results with a user input mechanism for user interaction.

Example 6 is the computing system of any or all previous examples wherein the visualization logic is configured to detect user interaction with the user input mechanism and display a property add/remove mechanism that is actuatable to add a property to, or remove a property from, the set of properties used to filter the consumable data.

Example 7 is the computing system of any or all previous examples wherein the service interface logic is configured to expose an application programming interface that receives a diagnostic file upload call from a client computing system, the diagnostic file upload call including a diagnostic file corresponding to the trace object.

Example 8 is the computing system of any or all previous examples wherein the service interface logic is configured to store the diagnostic file in a blob store and to store metadata corresponding to the diagnostic file in the scrubbed event data structure.

Example 9 is a computing system, comprising:
computing system functionality configured to process a program object by running an application with application functionality;
a remote trace listener configured to detect a state of the program object and generate a trace object indicative of the state of the program object, the trace object including a serialized form of the program object;
call wrapping logic that generates a trace object upload call to upload the trace object to a service computing system, the call wrapping logic wrapping the trace object in a set of identifying properties identifying the program object and a corresponding tenant and session from which it was obtained; and
call execution logic configured to execute the trace object upload call against an application programming interface (API) exposed by the service computing system to upload the trace object to the service computing system.

Example 10 is the computing system of any or all previous examples wherein the remote trace listener comprises:
class name assignment logic configured to derive a class name of the program object from a class type of the program object and assign the derived class name to a class name property in the trace object.

Example 11 is the computing system of any or all previous examples wherein the remote trace listener comprises:
object serialization logic configured to serialize the program object and assign the serialized program object to a string property of the trace object.

Example 12 is the computing system of any or all previous examples and further comprising:
a file uploader configured to upload a diagnostic file, corresponding to the program object, to the service computing system.

Example 13 is the computing system of any or all previous examples wherein the file uploader comprises:
diagnostic file identifier logic configured to identify the diagnostic file corresponding to the program object; and
call wrapping logic configured to generate a diagnostic file upload call to the service computing system, by wrapping the diagnostic file upload call in a predefined envelope with a set of identifier attributes that identify a tenant and session corresponding to the diagnostic file.

Example 14 is the computing system of any or all previous examples wherein the file uploader comprises:
call execution logic configured to execute the diagnostic file upload call against the API exposed by the service computing system to upload the diagnostic file to the service computing system.

Example 15 is a computer implemented method, comprising:
exposing an application programming interface (API) at a service computing system;
receiving, through the API, a trace object upload call from a client computing system, the trace object upload call including a trace object representing a state of a program object, as it is processed through a program flow on the client computing system;
re-organizing the trace object according to a predefined schema to generate a schematized trace object;
storing the schematized trace object as consumable data that can be searched on a property-by-property basis, based on properties of the program object;
exposing a search interface on the service computing system;
receiving, through the search interface, an input query indicative of a set of properties; and
filtering the consumable data to generate search results based on the set of properties in the input query.

Example 16 is the computer implemented method of any or all previous examples and further comprising:
identifying and removing personal identity information in the trace object, to generate scrubbed trace object data, before it is re-organized; and
storing the scrubbed trace object data in a scrubbed event data structure.

Example 17 is the computer implemented method of any or all previous examples and further comprising:
generating an entry in a processing queue corresponding to the scrubbed trace object data; and
re-organizing the scrubbed trace object data based on the corresponding entry in the processing queue.

Example 18 is the computer implemented method of any or all previous examples and further comprising:
generating a visualization of the search results with a user input mechanism for user interaction;

detecting user interaction with the user input mechanism; and displaying a property add/remove mechanism that is actuatable to add a property to, or remove a property from, the set of properties used to filter the consumable data.

Example 19 is the computer implemented method of any or all previous examples and further comprising:

expose a file upload API at the service computing system; and receiving a diagnostic file upload call from the client computing system, through the file upload API, the diagnostic file upload call including a diagnostic file corresponding to the trace object.

Example 20 is the computer implemented method of any or all previous examples and further comprising:

storing the diagnostic file in a blob store; and storing metadata corresponding to the diagnostic file in the scrubbed event data structure.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
at least one processor; and
memory storing instructions executable by the at least one processor, wherein the instructions, when executed, configure the computing system to:
receive, from a client device, a trace object upload call that includes a trace object representing a state of a program object, as it is processed through a program flow on the client device;
convert the trace object into a schematized trace object that is organized according to a predefined schema associated with the computing system; and
store, in a data store associated with the computing system, the schematized trace object as consumable data that is searchable on a property-by-property basis, based on properties of the program object.

2. The computing system of claim 1, wherein the instructions, when executed, configure the computing system to:
generate a search interface;
receive, through the search interface, a search input defining a query indicative of a set of properties; and
generate a search result by searching the consumable data based on the set of properties.

3. The computing system of claim 1, wherein the instructions configure the computing system to:
prior to converting the trace object into the schematized trace object, identify and remove personal identity information in the trace object, to generate scrubbed trace object data; and
convert the scrubbed trace object data into the schematized trace object.

4. The computing system of claim 3, wherein the instructions configure the computing system to:
generate an entry in a processing queue corresponding to the scrubbed trace object data; and
process the scrubbed trace object data based on the corresponding entry in the processing queue.

5. The computing system of claim 4, wherein the instructions configure the computing system to:
receive a plurality of trace objects associated with a plurality of different client devices, each trace object corresponding to one of the client devices and representing a state of a program object as it is processed through a program flow on the corresponding client device; and
convert each trace object, of the plurality of trace, into a schematized trace object that is organized according to the predefined schema associated with the computing system.

6. The computing system of claim 5, wherein the instructions configure the computing system to:
store the plurality of schematized trace objects as consumable data that can each be searched on a property-by-property basis; and
filter the consumable data in the plurality of schematized trace objects based on the set of properties.

7. The computing system of claim 5 wherein the instructions configure the computing system to:
generate a visualization of the search results with a user input mechanism; and
based on a detected user interaction with the user input mechanism, display a property add/remove mechanism that is actuatable to add a property to, or remove a property from, the set of properties used to filter the consumable data.

8. The computing system of claim 1, wherein the instructions configure the computing system to:
expose an application programming interface that receives a diagnostic file upload call from the client device, the diagnostic file upload call including a diagnostic file corresponding to the trace object.

9. The computing system of claim 8, wherein the instructions configure the computing system to:
store the diagnostic file in a blob store; and
store metadata corresponding to the diagnostic file in the scrubbed event data structure.

10. A method performed by a computing system, the method comprising:
receiving, from a client device, a trace object upload call that includes a trace object representing a state of a program object, as it is processed through a program flow on the client device;
convert the trace object into a schematized trace object that is organized according to a predefined schema associated with the computing system; and
storing, in a data store associated with the computing system, the schematized trace object as consumable data that is searchable on a property-by-property basis, based on properties of the program object.

11. The method of claim 10, and further comprising:
exposing an application programming interface (API);
receiving the trace object upload call through the API;
generating a search interface;
receiving, through the search interface, a search input defining a query indicative of a set of properties; and
generating a search result by searching the consumable data based on the set of properties.

12. The method of claim 10, and further comprising:
identifying personal identity information in the trace object;
removing the identified personal identity information to generate scrubbed trace object data; and
converting the scrubbed trace object data into the schematized trace object.

13. The method of claim 12, and further comprising:
generating an entry in a processing queue corresponding to the scrubbed trace object data; and re-organizing the scrubbed trace object data based on the corresponding entry in the processing queue.

14. The method of claim 13, and further comprising:
generating a visualization of the search results with a user input mechanism for user interaction;
detecting user interaction with the user input mechanism; and
displaying a property add/remove mechanism that is actuatable to add a property to, or remove a property from, the set of properties used to filter the consumable data.

15. The method of claim 14, and further comprising:
expose a file upload API at the service computing system; and
receiving a diagnostic file upload call from the client device, through the file upload API, the diagnostic file upload call including a diagnostic file corresponding to the trace object.

16. The method of claim 15, and further comprising:
storing the diagnostic file in a blob store; and
storing metadata corresponding to the diagnostic file in the scrubbed event data structure.

17. A computing device comprising:
at least one processor; and
memory storing instructions executable by the at least one processor, wherein the instructions, when executed, cause the computing device to:
process a program object by running an application with application functionality in a computing session;
detect a state of the program object; and
generate a trace object indicative of the state of the program object;
wrap the trace object in a set of identifying properties comprising an object property that identifies the program object;
generate a trace object upload call; and
execute the trace object upload call against an application programming interface (API) exposed by a service computing system to upload the trace object, including the set of identifying properties, to the service computing system.

18. The computing device of claim 17, wherein the instructions, when executed, cause the computing device to:
serialize the program object;
assign the serialized program object to a string property of the trace object; and
execute the diagnostic file upload call against the API exposed by the service computing system to upload the diagnostic file to the service computing system.

19. The computing device of claim 17, wherein the instructions, when executed, cause the computing device to:
identify a diagnostic file corresponding to the program object; and
generate a diagnostic file upload call to the service computing system, by wrapping the diagnostic file upload call in a predefined envelope with a set of identifier attributes that identify a tenant and a session corresponding to the diagnostic file;
upload the diagnostic file, corresponding to the program object, to the service computing system.

20. The computing device of claim 17, wherein the instructions, when executed, cause the computing device to:
derive a class name of the program object from a class type of the program object and assign the derived class name to a class name property in the trace object.

* * * * *